United States Patent
Nakajima

(10) Patent No.: US 10,108,199 B2
(45) Date of Patent: Oct. 23, 2018

(54) AUTONOMOUS MOVEMENT DEVICE, AUTONOMOUS MOVEMENT METHOD AND NON-TRANSITORY RECORDING MEDIUM

(71) Applicant: CASIO COMPUTER CO., LTD., Shibuya-ku, Tokyo (JP)

(72) Inventor: Mitsuyasu Nakajima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 96 days.

(21) Appl. No.: 15/276,320

(22) Filed: Sep. 26, 2016

(65) Prior Publication Data

US 2017/0168498 A1    Jun. 15, 2017

(30) Foreign Application Priority Data

Dec. 10, 2015 (JP) .................. 2015-241064

(51) Int. Cl.
G05D 1/02 (2006.01)
G05D 1/00 (2006.01)

(52) U.S. Cl.
CPC ......... G05D 1/0246 (2013.01); G05D 1/0088 (2013.01)

(58) Field of Classification Search
CPC .................. G05D 1/0246; G05D 1/0088
USPC .......................................................... 701/28
See application file for complete search history.

(56) References Cited

U.S. PATENT DOCUMENTS

| | | | |
|---|---|---|---|
| 5,378,969 A | 1/1995 | Haikawa et al. | |
| 6,466,866 B1* | 10/2002 | Sato | G01C 21/30 |
| | | | 340/990 |
| 9,714,841 B2* | 7/2017 | Toda | G01C 23/00 |
| 9,739,215 B2* | 8/2017 | Martin | F02D 21/08 |
| 9,773,335 B2 | 9/2017 | Koga | |
| 2009/0028387 A1 | 1/2009 | Jeong et al. | |
| 2009/0096686 A1 | 4/2009 | Niculescu et al. | |
| 2009/0254236 A1 | 10/2009 | Peters | |

(Continued)

FOREIGN PATENT DOCUMENTS

| | | |
|---|---|---|
| JP | 05297940 A | 11/1993 |
| JP | 2004005593 A | 1/2004 |

(Continued)

OTHER PUBLICATIONS

Related U.S. Appl. No. 15/359,689, filed Nov. 23, 2016, First Named Inventor: Yasushi Maeno, Title: "Autonomous Movement Device, Autonomous Movement Method, and Non-Transitory Recording Medium".

(Continued)

Primary Examiner — Muhammad Shafi
(74) Attorney, Agent, or Firm — Holtz, Holtz & Volek PC

(57) ABSTRACT

A determination on whether or not a local device position and a map contain an error is made. A position measurer of an autonomous movement device measures a local device position. A map memory stores the created map. A position estimator estimates the local device position. A determiner determines whether or not a difference between the measured position by the position measurer and the estimated position by the position estimator is within a predetermined error range. A map editor edits the stored map in the map memory when the determiner determines that the difference is out of the predetermined range.

14 Claims, 7 Drawing Sheets

(56) References Cited

U.S. PATENT DOCUMENTS

| | | |
|---|---|---|
| 2010/0145550 A1 | 6/2010 | Ross-Martin |
| 2011/0054689 A1 | 3/2011 | Nielsen et al. |
| 2011/0106450 A1* | 5/2011 | Toda ............... G01C 21/165 |
| | | 701/472 |
| 2012/0230550 A1 | 9/2012 | Kraut |
| 2012/0239191 A1 | 9/2012 | Versteeg et al. |
| 2013/0103405 A1* | 4/2013 | Namba ............. G01C 21/3608 |
| | | 704/275 |
| 2013/0138246 A1 | 5/2013 | Gutmann et al. |
| 2014/0225919 A1 | 8/2014 | Kaino et al. |
| 2014/0350839 A1 | 11/2014 | Pack et al. |
| 2015/0262361 A1 | 9/2015 | Lo et al. |
| 2016/0089783 A1 | 3/2016 | Noh et al. |
| 2016/0147230 A1 | 5/2016 | Munich et al. |
| 2016/0180533 A1 | 6/2016 | Pavani et al. |
| 2016/0334885 A1 | 11/2016 | Togawa et al. |
| 2017/0098375 A1 | 4/2017 | Smart |
| 2017/0148167 A1 | 5/2017 | Aratani |
| 2017/0164447 A1 | 6/2017 | Rogers et al. |
| 2017/0174227 A1 | 6/2017 | Tatourian et al. |

FOREIGN PATENT DOCUMENTS

| | | |
|---|---|---|
| JP | 2004276168 A | 10/2004 |
| JP | 2008059218 A | 3/2008 |
| JP | 2008071352 A | 3/2008 |
| JP | 2008090575 A | 4/2008 |
| JP | 2009169845 A | 7/2009 |
| JP | 2009193240 A | 8/2009 |
| JP | 2010288112 A | 12/2010 |
| JP | 2011048706 A | 3/2011 |
| JP | 2012089174 A | 5/2012 |
| JP | 2012216051 A | 11/2012 |
| JP | 2014186694 A | 10/2014 |
| JP | 2015146091 A | 8/2015 |

OTHER PUBLICATIONS

Tomokazu Sato, "Sequential Three-dimensional Reproduction from Motion Image by Feature Point Tracking, and Application Thereof, from Basics of Coordinate System to Application Case Examples and Recent Research Tendency", Image Sensing Symposium Tutorial.

Benavidez, et al., "Cloud-based realtime robotic visual slam", InSystems Conference (SysCon), 2015 9th Annual IEEE International Apr. 13, 2015, pp. 773-777, IEEE.

Oezuysal, et al., "Fast Keypoint Recognition using Random Ferns", https://cvlab.epfl.ch/files/content/sites/cvlab2/files/publications/publications/2010/0zuysalCLF10.pdf (Year: 2010).

Riisgaard, et al., "SLAM for Dummies", As accessed by the WayBackMachine.org, (first published on Nov. 8, 2010).

Japanese Office Action dated Oct. 24, 2017 issued in Japanese Application No. 2015-241064.

Andrew J. Davison, "Real-Time Simultaneous Localisation and Mapping with a Single Camera", Proceedings of the 9th IEEE International Conference on Computer Vision vol. 2, 2003, pp. 1403-1410.

Richard Hartley, et al., "Multiple View Geometry in Computer Vision", Second Edition, Mar. 2004.

Japanese Office Action dated Apr. 4, 2017 issued in related Japanese Application No. 2016-049350.

Related U.S. Appl. No. 15/269,917, filed Sep. 19, 2016, First Named Inventor: Tetsuro Varikawa, Title: "Autonomous Movement Device, Autonomous Movement Method and Non-Transitory Recording Medium".

Related U.S. Appl. No. 15/278,627, filed Sep. 28, 2016, First Named Inventor: Tetsuro Varikawa, Title: "Autonomous Movement Device, Autonomous Movement Method and Non-Transitory Recording Medium".

* cited by examiner

US 10,108,199 B2

AUTONOMOUS MOVEMENT DEVICE, AUTONOMOUS MOVEMENT METHOD AND NON-TRANSITORY RECORDING MEDIUM

CROSS-REFERENCE TO RELATED APPLICATION

This application claims the benefit of Japanese Patent Application No. 2015-241064, filed on Dec. 10, 2015, the entire disclosure of which is incorporated by reference herein.

FIELD

This application relates generally to an autonomous movement device, an autonomous movement method, and a non-transitory recording medium.

BACKGROUND

Autonomous movement devices that autonomously move in accordance with an application are becoming popular. For example, autonomous movement devices that autonomously move for the purpose of indoor space cleaning are known. In general, as for such autonomous movement devices, creation of a map in an actual space and estimation of the local device position in the real space are necessary.

As for the scheme of creating a map in the actual space, for example, a Simultaneous Localization And Mapping (SLAM) scheme has been known. The basic principle of the SLAM technology using a monocular camera is disclosed in Non Patent Literature 1, and by tracking the same feature point from the multiple frames of a motion image picked up by the camera, a process of alternately estimating the three-dimensional position of the local device (camera position) and the three-dimensional position of the feature point (this is collected up to form map information) is executed. In addition, there is an autonomous movement device that creates an environmental map in the actual space to perform autonomous movement (see, for example, Patent Literature 1).

Non Patent Literature 1 Andrew J. Davison, "Real-Time Simultaneous Localization and Mapping with a Single Camera", Proceedings of the 9th IEEE International Conference on Computer Vision Volume 2, 2003, pp. 1403-1410

Non Patent Literature 2 Richard Hartley, Andrew Zisserman, "Multiple View Geometry in Computer Vision", Second Edition, Cambridge. University Press, March 2004, chapter 9

Patent Literature 1 Unexamined Japanese Patent Application Kokai Publication No. 2009-169845

SUMMARY

The autonomous movement device of the present disclosure includes:

a position measurer that measures a local device position based on an amount of movement by a movement device;

a map memory that stores a map created using information on a plurality of images picked up by an image picker;

a position estimator that estimates the local device position based on the information on the plurality of images picked up by the image picker and information on the map stored in the map memory;

a determiner that determines whether or not a difference between the local device position measured by the position measurer and the local device position estimated by the position estimator is within a predetermined error range; and a map editor that edits the map stored in the map memory when the determiner determines that the difference is out of the predetermined error range.

BRIEF DESCRIPTION OF THE DRAWINGS

A more complete understanding of this application can be obtained when the following detailed description is considered in conjunction with the following drawings, in which.

DETAILED DESCRIPTION

Figure 1:
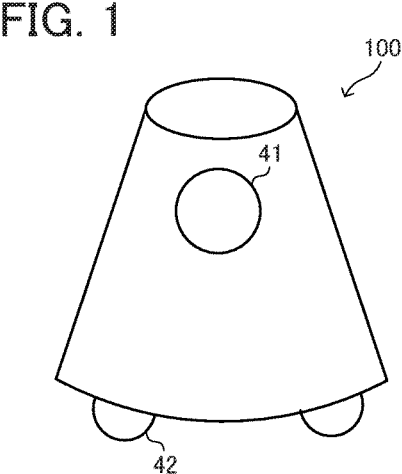
FIG. 1 is a diagram illustrating an external appearance of an autonomous movement device according to an embodiment.

An explanation will be given of an autonomous movement device according to an embodiment of the present disclosure. An autonomous movement device 100 autonomously moves in accordance with an application. Example applications are security and monitoring, indoor cleaning, pet up-keeping, and plaything.

The autonomous movement device 100 includes, as an external appearance, an image picker 41 and a driver 42.

The image picker 41 includes a monocular imaging device (camera). The image picker 41 obtains an image (frame) at, for example, 30 fps. The autonomous movement device 100 performs autonomous movement while recognizing the local device position and the surrounding environment in a real-time manner based on the images sequentially obtained by the image picker 41.

The driver 42 is a moving device which is an independent two-wheel drive type, and which includes wheels and a motor. The autonomous movement device 100 is capable of parallel movement (translation movement) in the back-and-forth direction by the two wheels driven in the same direction, of rotating (direction change) at the present location by the two wheels driven in the opposite directions, and of turning (translation movement+rotation (direction change) movement) by the two wheels driven at respective speeds changed differently. In addition, each wheel is provided with a rotary encoder which measures the number of rotations of the wheel, and is capable of calculating a translation movement amount and a rotation amount by utilizing a geometric relationship, such as the diameter of the wheel, the distance between the wheels, and the like. When, for example, the diameter of the wheel is D, and the number of rotations is R (which is measured by the rotary encoder), the translation movement amount of this wheel at the floor contacting part can be defined as π×D×R. In addition, when the diameter of the wheel is D, the distance between the wheels is I, the number of rotations by the right wheel is $R_R$, and the number of rotations by the left wheel is $R_L$, the rotation amount for direction change can be defined as (when a clockwise rotation is defined as a positive rotation) 360 degrees×D×$(R_L-R_R)/(2×I)$. By accumulating those translation movement amount and rotation amount in sequence, the driver 42 functions as a so-called odometry which is capable of measuring the local device position (the position and the direction with reference to the position and the direction at the start of movement).

The precision of the local device position obtained from the odometry and that of the direction therefrom are often reduced due to the friction of the wheel, a slip, and the like. In particular, since the error is being accumulated, the precision decreases as time advances. However, as for the rotation component (the direction information) from the odometry, the precision can be improved using angular speed sensor information to be explained later. In addition, by utilizing an unillustrated direction sensor which detects an earth magnetism and which specifies the direction, absolute direction information utilizing the earth magnetism is obtainable regardless of the obtained value from the odometry.

Note that crawlers may be applied instead of the wheels, and a movement may be made by multiple (for example, two) walking legs. In those cases, like the case of the wheels, the local device position and the direction are measurable based on the movement of the two crawlers and that of the legs.

Figure 2:
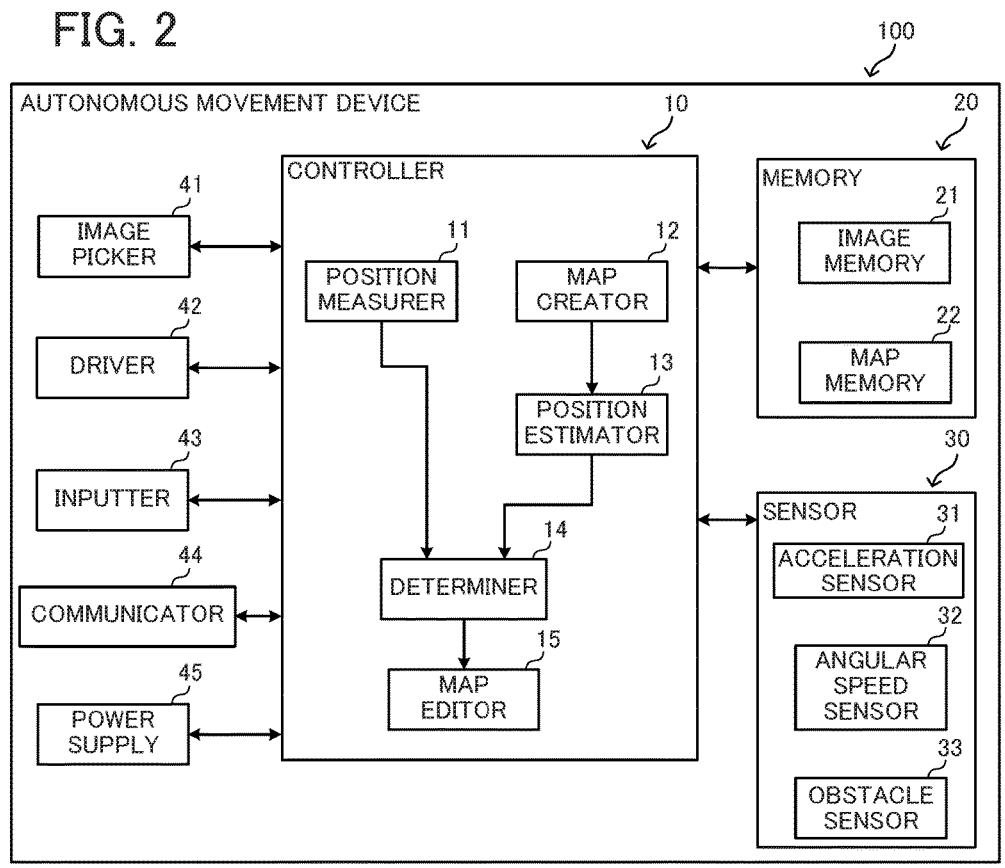
FIG. 2 is a diagram illustrating a structure of the autonomous movement device according to the embodiment.

As illustrated in FIG. 2, the autonomous movement device 100 includes, in addition to the image picker 41 and the driver 42, a controller 10, a memory 20, a sensor 30, inputter 43, communicator 44, and a power supply 45.

The controller 10 includes a Central Processing Unit (CPU) and the like, executes a program stored in the memory 20, thereby accomplishing the functions of respective components (a position measurer 11, a map creator 12, a position estimator 13, a determiner 14, and a map editor 15) to be explained later.

The memory 20 includes a Read Only Memory (ROM), a Random Access Memory (RAM), and the like, and includes an image memory 21 and a map memory 22. The ROM stores programs (for example, programs relating to calculation by an SLAM scheme to be explained later and autonomous movement control process) to be executed by the CPU of the controller 10, and necessary data in order to execute the programs. The RAM stores data to be created and changed during the execution of the programs.

The image memory 21 stores images picked up by the image picker 41. However, in order to save the memory capacity efficiently, only some of the picked up images may be stored, or a feature quantity of the image may be stored instead of the image itself. As for the important image (a key frame to be explained later), information on the local device position (the position of the local device and the direction thereof) measured by the above odometry and information on the local device position (the position of the local device and the direction thereof) estimated by the SLAM scheme to be explained later are stored together with information on the image.

The map memory 22 stores a map (information on the three-dimensional position of a feature point and that of an obstacle) created by the map creator 12 based on the SLAM scheme to be explained later and information from an obstacle sensor 33.

The sensor 30 includes an acceleration sensor 31, an angular speed sensor 32, and the obstacle sensor 33. The acceleration sensor 31 measures the acceleration in the XYZ (three axes) directions. By performing time integration on the measured values, the velocity in each direction that is X, Y, or Z is obtainable, and by performing time integration on those velocities, a change mount (a moved distance) of the position in each direction that is X, Y, or Z is also obtainable (however, since the sensor values are integrated twice, the accumulated error becomes quite large). The angular speed sensor 32 measures the angular speed (angular movement amount per a unit time). There is a known fact that obtainment of the direction using the angular speed sensor 32 improves the precision more than obtainment of the direction based on the number of rotations by the wheel. The obstacle sensor 33 detects an obstacle while the autonomous movement device 100 is moving, and is, for example, an infrared sensor or an ultrasound sensor. Note that the obstacle may be detected using the image picker 41 instead of applying the individual obstacle sensor 33. In addition, an unillustrated bumper sensor that detects a collision with other objects may be applied. Still further, an unillustrated direction sensor which detects an earth magnetism and which specifies the direction may be provided. Application of the direction sensor enables an obtainment of the information on the absolute direction utilizing the earth magnetism regardless of the obtained value from the odometry.

Operation buttons that are the inputter 43 to operate the autonomous movement device 100 are provided. The operation buttons include, for example, a power button, a mode change button (to change the modes, such as a cleaning mode and a pet mode), and an initialize button (to start over map creation). As the inputter 43, an unillustrated microphone to input sound, and a sound recognizer that recognizes the speech operation instruction to the autonomous movement device 100 may be provided.

The communicator 44 is a module for a communication with an external device, and is a wireless module including an antenna when a wireless communication with the external device is performed. An example communicator 44 is a wireless module for a short-range wireless communication based on the Bluetooth (Registered Trademark). The communicator 44 exchanges data between the autonomous movement device 100 and the external device.

The power supply 45 is a source of power to actuate the autonomous movement device 100, and in general, is built-in rechargeable batteries, but may be solar batteries or a system to which power is wirelessly supplied from the floor surface. When the power supply 45 is rechargeable batteries, charging is performed by a charging station (home base) with which the autonomous movement device 100 is docked.

Next, functions of the controller 10 will be explained. The controller 10 includes the position measurer 11, the map creator 12, the position estimator 13, the determiner 14, and the map editor 15, and performs an arithmetic operation by the SLAM scheme to be explained later, a movement instruction to the autonomous movement device 100, and the like. In addition, the controller 10 is compatible with a multi-thread function, and is capable of simultaneously executing multiple threads (different process flows).

The position measurer 11 measures the local device position based on the movement of the wheels of the driver 42 and the action of the motor thereof. More specifically, based on a presumption that the floor is level, and the wheels do not slip, the moved distance of the wheel at the part in contact with the floor can be determined as $\pi \times D \times R$ where the diameter of each wheel is D, and the number of rotations by the wheel is R (which is measured by the rotary encoder). Hence, the translation movement amount, the translation direction, and the amount of direction change (the rotation angle) are obtainable based on those factors and the distance between the wheels. By adding the obtained values in sequence, as the odometry, the local device position and the direction can be measured. When the floor is not level, obtainment of the translation movement amount in view of the height direction is necessary, but this is obtainable by grasping an amount of change in height direction by the acceleration sensor 31. In addition, as for the slip of the wheel, the error can be reduced by providing, in addition to the drive wheels, a wheel for measuring the amount of movement.

The map creator 12 stores, in the map memory 22 as map information, a three-dimensional position (Map point) of a feature point estimated by the SLAM scheme based on information on the image stored in the image memory 21 and information on the local device position and the direction when the image is picked up, and a three-dimensional position of an obstacle obtained based on information on the local device position and the direction when the obstacle sensor 33 detects the obstacle.

The position estimator 13 estimates, as a visual odometry, the local device position and the direction based on the SLAM scheme to be explained later.

The determiner 14 determines whether or not the difference between the position and direction measured by the position measurer 11, and, the position and direction estimated by the position estimator 13 is within a predetermined error range. When the correct position and direction are measured by the odometry (the position measurer 11), and the correct position and direction are also estimated by the SLAM scheme (the visual odometry, that is, position estimator 13), those are substantially consistent with each other, and thus the map information stored in the map memory 22 can be estimated as correct in this case. When, however, the measurement of the position and direction and the estimation thereof contain an error, such an error is accumulated, causing the measured value to be inconsistent with the estimated value. In this case, the map information stored in the map memory 22 can be estimated as containing accumulated errors. Hence, by determining whether or not the difference between those pieces of information is within the predetermined error range, a determination on whether or not the map information is correct can be made.

The map editor 15 edits the map when the determiner 14 determines that the map information stored in the map memory 22 is incorrect. The simplest process of editing the map is a process of deleting such a map.

Figure 3:
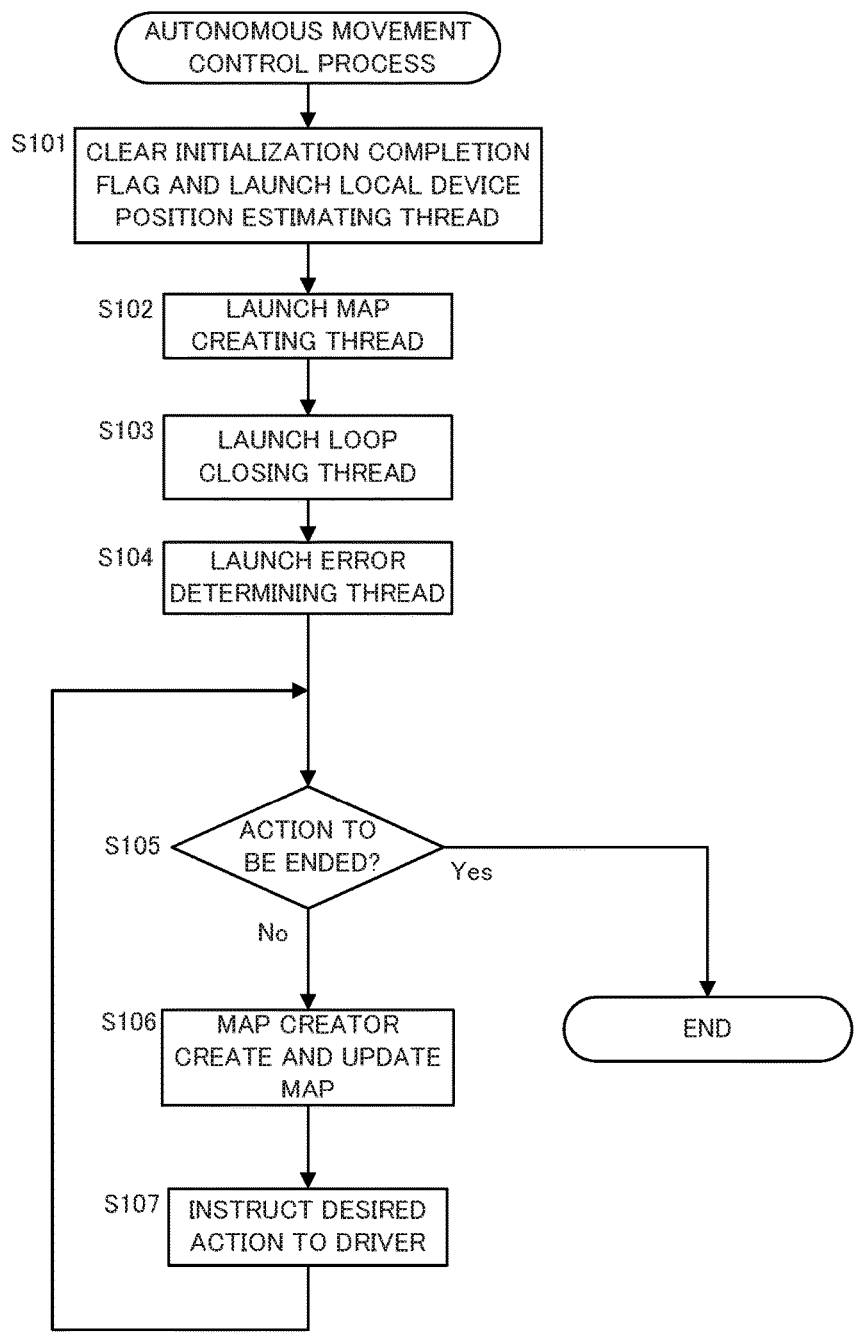
FIG. 3 is a flowchart for an entire autonomous movement control process according to the embodiment.

FIG. 3 is a main flow for the autonomous movement device 100. First, the controller 10 clears out an initialization completion flag, launches (step S101) a local device position estimating thread, and then launches respective threads that are a map creating thread (step S102), a loop closing thread (step S103), and an error determining thread (step S104). By launching the local device position estimating thread, the map creating thread, and the like, the creation of the map information and the visual odometry (information on the local device position estimated based on the map and the image) by the SLAM scheme starts. The error determining thread is one of features of this embodiment, and will be explained in detail later.

Next, the controller 10 determines (step S105) whether or not to end the action, and when the action is to be ended (step S105: YES), the controller 10 ends the action, and when the action is not to be ended (step S105: NO), the map creator 12 creates and updates (step S106) the map information. Subsequently, the controller 10 instructs (step S107) the desired action to the driver 42 for the autonomous movement, and returns the process to the step S105. Hence, the map information is updated as needed while the autonomous movement is being performed based on this map information.

As a typical example, first, when the power supply 45 is activated with the autonomous movement device 100 being located at the charging station, the autonomous movement device 100 moves each room of a housing entirely with the aid of the obstacle sensor 33, specifies the position of an obstacle like a wall by the obstacle sensor 33, and creates the map information containing the position of the obstacle. When the map is created to some level, an area which has the map information not created yet but which can be estimated as a movable area for the autonomous movement device 100 becomes apparent. Hence, the autonomous movement device 100 may autonomously move to this area to create the map of a further wide range. Next, when map information on substantially all movable ranges for the autonomous movement device 100 is created, the autonomous movement device 100 is enabled to efficiently move based on the map information. For example, the autonomous movement device 100 becomes able to return to the charging station with the shortest route from any position in any room, and to clean the room efficiently.

Figure 4:
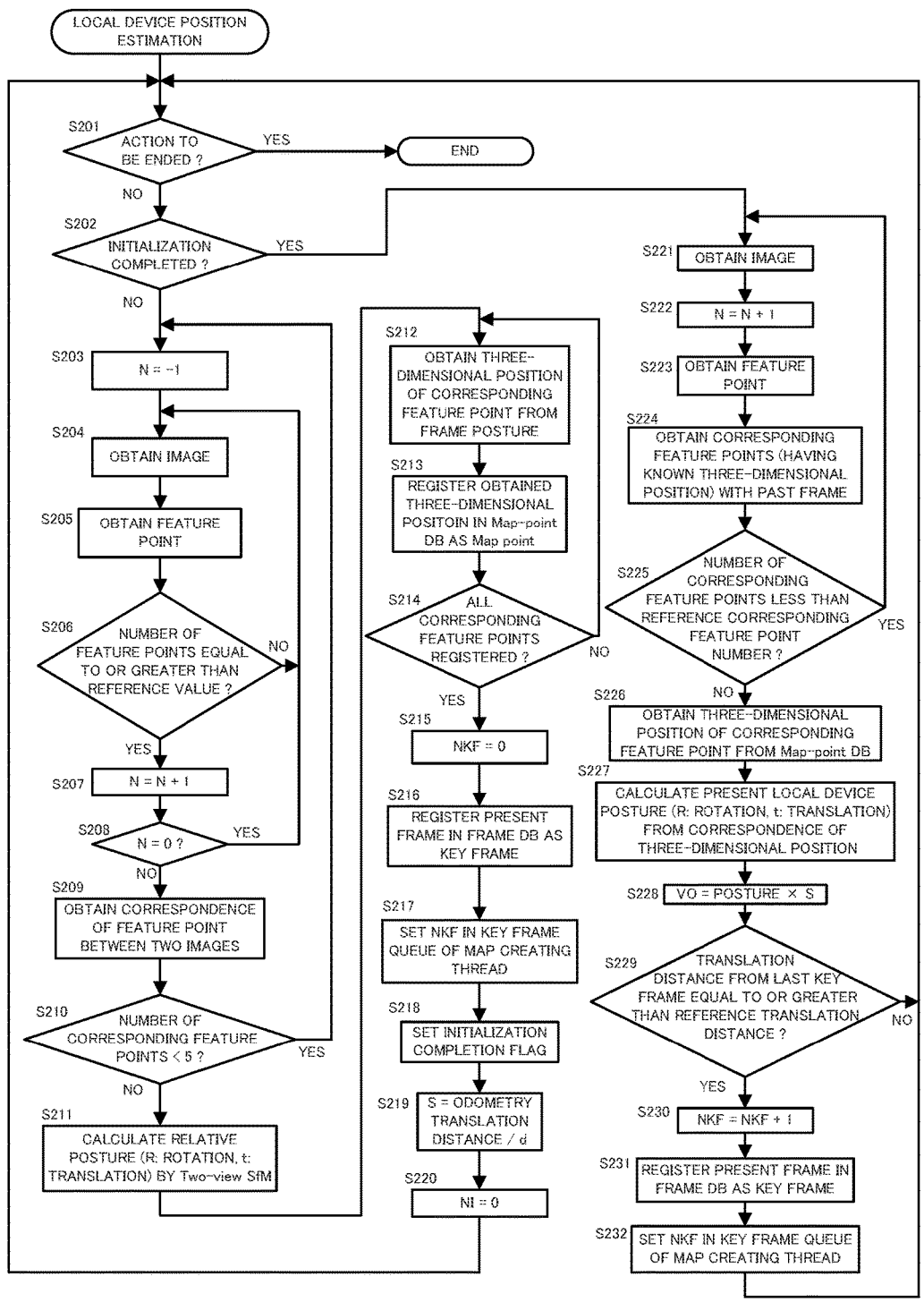
FIG. 4 is a flowchart for a process in a local device position estimating thread of the autonomous movement control process according to the embodiment.
Figure 5:
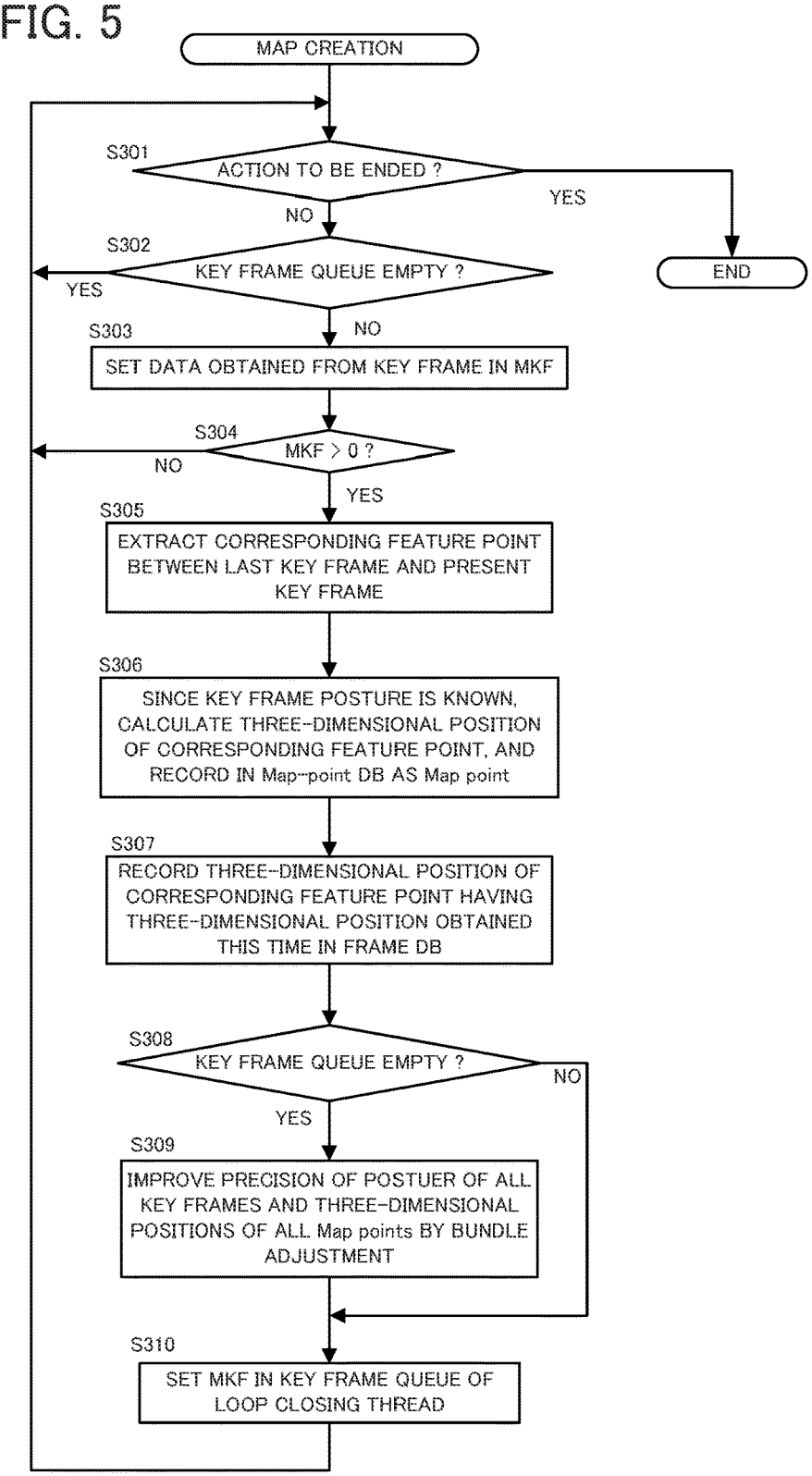
FIG. 5 is a flowchart for a process in a map creating thread of the autonomous movement control process according to the embodiment.

The local device position estimating thread launched in the step S101 in the main flow (see FIG. 3) for the autonomous movement device 100 will be explained with reference to FIG. 4. This thread is a process of causing the position estimator 13 to execute an initializing process at first, and then continuing the local device position estimation (the local device position is estimated by the visual odometry using the image obtained by the image picker 41).

First, the position estimator 13 determines (step S201) whether or not to end the action. When the action is to be ended (step S201: YES), the action is ended, and when the action is not to be ended (step S201: No), the position estimator 13 determines (step S202) whether or not the initialization has been already made. When the initialization has been already made (step S202: YES), the local device position estimating process subsequent to step S221 is executed, and when the initialization has not been made yet (step S202: NO), the process progresses to step S203, and an initializing process is executed. First, an explanation will be given of the initializing process.

In the initializing process, first, the position estimator 13 sets (step S203) a frame counter N to be −1, and the image picker 41 picks up (step S204) the image. The image can be picked up at, for example, 30 fps (the obtained image is also called a frame). Next, a two-dimensional feature point is obtained (step S205) from the obtained image. The two-dimensional feature point is a portion which has a feature in the image, such as an edge within the image, and is obtainable by algorithms, such as a Scale-Invariant Future Transform (SIFT) and a Speed-Up Robust Features (SURF). Note that other algorithms are also applicable to obtain the two-dimensional feature point.

When the number of obtained two-dimensional feature points is small, a calculation based on a Two-view Structure from Motion scheme to be explained later is not executable, and thus the position estimator 13 compares, in step S206, the number of obtained two-dimensional feature points with a reference value (for example, 10). When the number of obtained two-dimensional feature points is less than the reference value (step S206: NO), the position estimator 13 returns the process to the step S204, and the obtainment of the image and the obtainment of the two-dimensional feature point are repeated until the number of obtained two-dimensional feature points becomes equal to or greater than the reference value. At this stage, although the map information has not been created yet, for example, in the above-explained typical case, the autonomous movement device 100 has started moving each rooms of the housing entirely with the aid of the obstacle sensor 33. Accordingly, when the obtainment of the image and the obtainment of two-dimensional feature point are repeated in this initializing process, the image obtainment is repeated while the autonomous movement device 100 is moving. Hence, various images are obtainable, and image obtainment with a large number of two-dimensional feature points in future is expected.

When the number of obtained two-dimensional feature points is equal to or greater than the reference value (step S206: YES), the position estimator 13 increments (step S207) the frame counter N. Next, the position estimator 13 determines (step S208) whether or not the frame counter N is zero. When the frame counter N is zero (step S208: YES), this means that only a single image has been obtained, and thus the position estimator 13 returns the process to the step S204 in order to obtain the second image. Although not illustrated in the flowchart that is FIG. 4, when the local device position at the time of the obtainment of the first image and the local device position at the time of the obtainment of the second image are apart from each other to some level, the precision for a posture estimation in the subsequent process improves. Hence, when the process returns from the step S208 to the step S204, a stand-by process until the translation distance by the odometry in accordance with an action instruction to the driver 42 in the step S107 in the main flow (see FIG. 3) becomes equal to or greater than a predetermined distance (for example, 1 m) may be added.

When the frame counter N is not zero (step S208: NO), this indicates that the two images have been already obtained, and the position estimator 13 obtains (step S209) the correspondence of the two-dimensional feature point between the two images (the consistent point in the actual environment is present in the respective images, and the correspondence is obtainable). When the number of corresponding feature points is less than five, the posture estimation between the two images to be explained later is not executable, and thus the position estimator 13 determines (step S210) whether or not the number of corresponding feature points is less than five. When the number of corresponding feature points is less than five (step S210: YES), in order to start over the obtainment of the initial image, the process returns to the step S203. When the number of corresponding feature points is equal to or greater than five (step S210: NO), the posture between the two images (the difference between the positions where the respective images are obtained (translation vector t) and the difference in directions (rotation matrix R)) are estimatable (step S211) by the Two-view Structure from Motion scheme.

As for this estimation, more specifically, a basic matrix E is obtained from the corresponding feature points, and the basic matrix E is decomposed into the translation vector t and the rotation matrix R to obtain the estimation, but the details are disclosed in Non Patent Literature 2. Hence, the detailed explanation will be omitted in this specification.

The value of each element in the translation vector t to be obtained in this case (when a movement in the three-dimensional space is expected, with the position where the first image is obtained being as an origin, three elements that are X, Y, Z are present) differs from the value in the actual environment (according to the Two-view Structure from Motion scheme, the value in the actual environment itself is not obtainable, and a value in a similar space to the actual environment is to be obtained). Hence, such a value is considered as the value in the SLAM space, and the following explanation will be given with reference to the coordinates in the SLAM space (SLAM coordinate system).

When the posture (the translation vector t and the rotation matrix R) between the two images is obtained, the value thereof indicates the posture of the second image (the local device position (translation vector t) and the direction (rotation matrix R) when the second image is obtained) with reference to the first image (the position where the first image is obtained is defined as the origin of the SLAM coordinate system, the translation vector is zero vector, and the rotation matrix is a unit matrix I). In this case, when the postures of the respective two images (the local device position (translation vector t) and the direction (rotation matrix R) when the image (frame) is obtained, also referred to as a frame posture) have been obtained, the map creator 12 obtains (step S212) a three-dimensional position in the SLAM coordinate system of the two-dimensional feature point (corresponding feature point) that has the correspondence between those images based on the following attitude.

When the coordinates (frame coordinates, already known) of the two-dimensional feature point in the image are (u, v), and the three-dimensional position (unknown) of such a two-dimensional feature point in the SLAM coordinate system is (X, Y, Z), the relationship when those are expressed by the homogeneous coordinates can be expressed as the following formula (1) using a perspective projection matrix P. In this case, the symbol [~] means "equal except a constant multiplication other than zero" (that is, equal or multiple by a constant number (not zero)), and the symbol ['] mean "transposition".

$$(uv1)' \sim P(XYZ1)' \quad (1)$$

In the above formula (1), P is a matrix of three by four, and can be expressed as the following formula (2) by a three-by-three matrix A and external parameters R and t indicating the posture of the image (the frame posture). In this case, (R|t) represents a matrix that arranges the translation column vector t at the right side of the rotation matrix R.

$$P = A(R|t) \quad (2)$$

In the above formula (2), R and t are obtained as the frame posture as explained above. In addition, since an internal parameter A of the camera is defined by the focal point distance and the imaging element size, thus becoming a constant number when the image picker 41 has been chosen beforehand.

When one of the two-dimensional feature points that have the correspondence between the two images is present at frame coordinates $(u_1, v_1)$ in the first image and at frame coordinates $(u_2, v_2)$ in the second image, the following formula (3) and formula (4) are satisfied. In this case, I is a unit matrix, 0 is a zero vector, and (L|r) is a matrix that arranges the column vector r at the right side of the matrix L.

$$(u_1 v_1 1)' \sim A(I|0)(XYZ1)' \quad (3)$$

$$(u_2 v_2 1)' \sim A(R|t)(XYZ1)' \quad (4)$$

In the above formula (3) and formula (4), since a formula can be made for each of $u_1$, $v_1$, $u_2$, and $v_2$, four formulae can be made, but since unknown values are three that are X, Y, and Z, those unknown values X, Y, and Z can be obtained, and those represent the three-dimensional position of the two-dimensional feature point in the SLAM coordinate system. Note that since the number of formulae is greater than the number of unknown values, for example, X, Y, and Z obtained based on $u_1$, $v_1$, $u_2$ may differ from X, Y, and Z obtained based on $u_1$, $v_1$, $v_2$. According to such a case, a simultaneous linear equation under an excessive condition is established, and in general, there is no solution, but the map creator 12 applies the least square scheme to obtain most probable X, Y, and Z.

When the three-dimensional position (X, Y, Z) of the two-dimensional feature point in the SLAM coordinate system is obtained, the map creator 12 registers (step S213) this position as a Map point in a Map-point database (also referred to as a Map-point DB (DataBase), stored in the map memory 22). As for the element to be registered in the Map-point database, at least "X, Y, Z that represent the three-dimensional position of the two-dimensional feature point in the SLAM coordinate system" and "the feature quantity of the two-dimensional feature point" (the feature quantity obtained by, for example, SIFT). In addition, when a "time stamp" (a value or the like of a key frame counter NKF (a variable indicating a present key frame number) when registered in the Map-point database) is added as the element to be registered in the Map-point database, edition (for example, recovery to the past condition) of the Map-point database becomes convenient.

Next, the map creator 12 determines (step S214) whether or not all two-dimensional feature points (corresponding feature points) that have the correspondence between the two images are registered in the Map-point database, and when all two-dimensional feature points are not registered yet (step S214: NO), the map creator 12 returns the process to the step S212, and when all two-dimensional feature points are registered (step S214: YES), the map creator 12 progresses the process to step S215.

Next, the position estimator 13 initializes (step S215) the NKF (a variable indicating the counter of a key frame (indicating the image to be processed in the subsequent thread)) to zero, and the second image is registered (step S216) as the key frame in a frame database (also referred to as a frame DB (DataBase), and stored in the image memory 21).

The elements to be registered in the frame database are a "key frame number" (the value of the key frame counter NKF at the time of registration), a "posture" (a local device position (translation vector t) in the SLAM coordinate system at the time of image-pickup and a direction (rotation matrix R)), a "posture in the actual environment measured by the odometry" (a local device position and a direction obtained based on the moved distance by the driver 42 in the actual environment), "all extracted two-dimensional feature points", "points which have known three-dimensional positions as the respective Map points among all two-dimensional feature points", and a "feature of the key frame itself".

In the above elements, the "feature of the key frame itself" is data to make the process of obtaining the image similarity level between the key frames efficient, and in general, the histogram of the two-dimensional feature point in the image is applicable, but the image itself may be taken as the "feature of the key frame itself". In addition, the "posture measured by the odometry in the actual environment" may be expressed by the translation vector t and the rotation matrix R, but in general, since the autonomous movement device 100 moves on the two-dimensional plane, such an element may be simplified to two-dimensional data, and may be expressed by two-dimensional coordinates (X, Y) and a direction $\phi$ with reference to the position (origin) at the time of the start of movement and the direction.

Next, in order to let the map creating thread to know that the key frame has been created, the position estimator 13 sets (step S217) the key frame counter NKF in the key frame queue (where queue employs a first-in and first-out data structure) of the map creating thread.

The initializing process of the local device position estimating thread completes through the above steps, and the position estimator 13 sets (step S218) the initialization completion flag.

Next, in order to obtain a scalar correspondence between the SLAM coordinates and the actual environment coordinates, the position estimator 13 divides the translation distance (obtained by the coordinates in the actual environment) by the odometry by a translation distance d in the SLAM coordinate system estimated through the above process, thereby obtaining (step S219) a scale S.

Subsequently, the position estimator 13 clears out (step S220) a counter NI applied in an error determining thread to be explained later, and progresses the process to, through the step S201, and the step S202, step S221 that is a process when the initialization has completed.

An explanation will be given of the process when the initialization has completed. This process is the normal process in the local device position estimating thread, and is the process of causing the position estimator 13 to estimate the present local device position and the direction (the translation vector t in the SLAM coordinate system and the rotation matrix R) in sequence.

The position estimator 13 picks up (step S221) an image by the image picker 41, and increments (step S222) the frame counter N. Next, the two-dimensional feature point contained in the picked-up image is obtained (step S223). Subsequently, from the information on the past key frame (for example, an image that has the key frame number of NKF) registered in the frame database, the two-dimensional feature point that has the known three-dimensional position (the Map point registered in the Map-point database) among the two-dimensional feature points contained in the information on this image is obtained, and the two-dimensional feature point (the corresponding feature point) that has the correspondence with the presently picked-up image is extracted (step S224).

Next, the position estimator 13 determines (step S225) whether or not the number of corresponding feature points is less than the predetermined number (for example, 10, hereinafter, referred to as a "reference corresponding feature point number"). When the number of corresponding feature points is less than the reference corresponding feature point number (step S225: YES), the posture precision to be estimated by the SLAM scheme decreases, and thus the position estimator 13 returns the process to the step S221 to obtain an image without executing a position estimation. In this case, instead of immediate return to the step S221, the process may return to the step S224, and the key frame that has the number of corresponding feature points which is equal to or greater than the reference corresponding feature point number may be searched from the registered key frames in the frame database. In this case, when the key frame that has the number of corresponding feature points which is equal to or greater than the reference corresponding feature point number is not found among the registered key frames in the frame database, the process returns to the step S221.

When the corresponding feature points that are equal to or greater than the reference corresponding feature point number are extracted (step S225: NO), the position estimator 13 obtains (step S226) the three-dimensional position ($X_i$, $Y_i$, $Z_i$) of each corresponding feature point from the Map-point database. When the frame coordinates of the corresponding feature point contained in the presently picked-up image are ($u_i$, $v_i$), and the three-dimensional position of such a corresponding feature point is expressed as ($X_i$, $Y_i$, $Z_i$) (where i is a value from 1 to the number of corresponding feature points), values ($ux_i$, $vx_i$) obtained by projecting the three-dimensional position ($X_i$, $Y_i$, $Z_i$) of each corresponding feature point in a frame coordinate system through the following formula (5) should be ideally consistent with the frame coordinates ($u_i$, $v_i$).

$$(ux_i, vx_i, 1)' \sim A(R|t)(X_i Y_i Z_i)' \qquad (5)$$

In practice, since ($X_i$, $Y_i$, $Z_i$) and ($u_i$, $v_i$) contain errors, ($ux_i$, $vx_i$) is hardly consistent with ($u_i$, $v_i$) in reality. In addition, although the unknown values are R and t only (in a three-dimensional space, each becomes three-dimensional, and the number of unknown values is 3+3=6), the number of the formulae is twice as much as the number of corresponding feature points (this is because there is a corresponding formula to each of u, v in the frame coordinates per a corresponding feature point), a simultaneous linear equation under the excessive condition is established, and thus the solution should be obtained by the least square scheme as explained above. More specifically, the position estimator 13 is to obtain the posture (the translation vector t and the rotation matrix R) that minimizes a cost function E1 expressed by the following formula (6). This becomes the local device posture (the local device position and the direction expressed by the translation vector t and the rotation matrix R, respectively) in the SLAM coordinate system obtained by the SLAM scheme. The position estimator 13 estimates (step S227) the posture of the local device in this way.

[Formula 1]

$$E1 = \sum_{i=1}^{Number\ of\ corresponding\ feature\ points} ((u_i - ux_i)^2 + (v_i - vx_i)^2) \qquad (6)$$

Since the present posture of the local device (the translation vector t and the rotation matrix R) in the SLAM coordinate system has been obtained, the position estimator 13 multiplies such a posture by the scale S, thereby obtaining (step S228) a Visual Odometry (VO). The VO is utilizable as the local device position and the direction in the actual environment.

Next, the position estimator 13 determines (step S229) whether or not the local device has moved by equal to or greater than the predetermined distance (for example, 1 m, hereinafter, referred to as a "reference translation distance") from the local device position when the last key frame (the image that has the key frame number of NKF) registered in the frame DB, and when the local device has moved by equal to or greater than the reference translation distance (step S229: YES), the position estimator 13 increments (step S230) the key frame counter NKF, and then registers (step S231) the present frame as the key frame in the frame DB.

When the local device has moved by less than the reference translation distance (step S229: NO), the position estimator 13 returns the process to the step S201.

In this case, the moved distance of the local device to be compared with the reference translation distance may be a translation distance (an absolute vector value (square root of sum of squares of the element) that is a difference in the translation vector between both frames) from the last frame to the present frame obtained by the odometry, or may be obtained by the VO (Visual Odometry) as explained above. The details to be registered in the frame DB are the "key frame number", the "posture", the "posture measured by the odometry in the actual environment", "all extracted two-dimensional feature points", the "two-dimensional feature points that have known three-dimensional position as the Map points among all two-dimensional feature points", and the "feature of the key frame itself" as explained above.

Subsequently, in order to let the map creating thread to know the creation of the new key frame, the position estimator 13 sets (step S232) the key frame counter NFK in the key frame queue of the map creating thread. Next, the position estimator 13 returns the process to the step S201. Note that the key frame counter NKF, the counter NI, the scale S, the Map-point DB, and the frame DB are stored in the memory 20 in such a way that the respective values are also referable in other threads.

Next, an explanation will be given of the map creating thread launched in the step S102 of the main flow (see FIG. 3) for the autonomous movement device 100. In this thread, the map creator 12 calculates the three-dimensional position of the corresponding feature point in the key frame, and creates the map information (Map-point DB).

First, the map creator 12 determines (step S301) whether or not to end the action (step S301). When the action is to be ended (step S301: YES), the action is ended, and when the action is not to be ended (step S301: NO), the map creator 12 determines (step S302) whether or not the key frame queue is empty. When the key frame queue is empty (step S302: YES), the map creator 12 returns the process to the step S301, and when the key frame queue is not empty (step S302: NO), the map creator 12 takes out data from the key frame queue and sets (step S303) to the MKF (a variable indicating the key frame number of the key frame to be processed in the map creating thread). The map creator 12 determines (step S304) whether or not the MKF is zero, and when the MKF is zero (step S304: NO), the map creator 12 returns the process to the step S301, and waits for until the data is entered in the key frame queue. When the MKF is equal to or greater than 1 (step S304: YES), the process progresses to the following process.

The map creator 12 refers to the frame DB, and extracts (step S305) the two-dimensional feature point (the corresponding feature point) that has the correspondence between the last key frame (the key frame that has the key frame number of MKF−1) and the present key frame (the key frame that has the key frame number of MKF). Since the postures (the translation vectors t and the rotation matrices R) of the respective key frames are also registered in the frame DB, the three-dimensional position of the corresponding feature point is calculatable by the same process at the time of the initializing process in the local device position estimating thread. The map creator 12 registers (step S306) the corresponding feature point which has the calculated three-dimensional position in the Map-point DB as the Map point. The map creator 12 also registers (step S307), in the frame DB, the three-dimensional position for the two-dimensional feature point that has the calculated three-dimensional position at this time.

Note that when the extracted corresponding feature point by the map creator 12 has been already registered in the Map-point DB, the three-dimensional position calculation may be skipped and the process for the next corresponding feature point (which is not registered in the Map-point DB yet), or a three-dimensional position calculation may be executed again, and the three-dimensional position already registered in the Map-point DB or the three-dimensional position of the corresponding feature point in the frame DB may be updated.

Next, the map creator 12 determines (step S308) whether or not the key frame queue is empty. When the key frame queue is empty (step S308: YES), a bundle adjustment process is performed on the postures of all key frames and the three-dimensional positions of all Map points so as to improve the precision (step S309), and the map creator 12 proceeds the process to the step S310. When the key frame queue is not empty (step S308: NO), the process progresses to the step S310. Subsequently, the map creator 12 sets (step S310) the MKF in the key frame queue of the loop closing thread, and returns the process to the step S301.

Note that the bundle adjustment process is a non-linear optimization scheme that simultaneously estimates both the camera posture (the key frame posture) and the three-dimensional position of the Map point, and performs an optimization so as to minimize an error produced when the Map point is projected on the key frame.

By executing this bundle adjustment process, the precision of the key frame posture and that of the three-dimensional position of the Map point are improved. When, however, this process is not executed, simply improvement of the precision is not accomplished, which does not bring any technical problem. Hence, execution of this process is not always necessary every time there is no other process (when, for example, the key frame queue is empty).

In addition, by executing the bundle adjustment process, a Map point that has a larger error than the predetermined value when projected on the key frame may be found. Such a Map point with a large error affects the SLAM estimation. Hence, this Map point may be deleted from the Map-point DB and the frame DB or a flag to identify that this Map point has a large error and needs an attention may be set up. Note that the bundle adjustment process is optional according to this embodiment, and thus the explanation for the process detail will be omitted in this specification.

Figure 6:
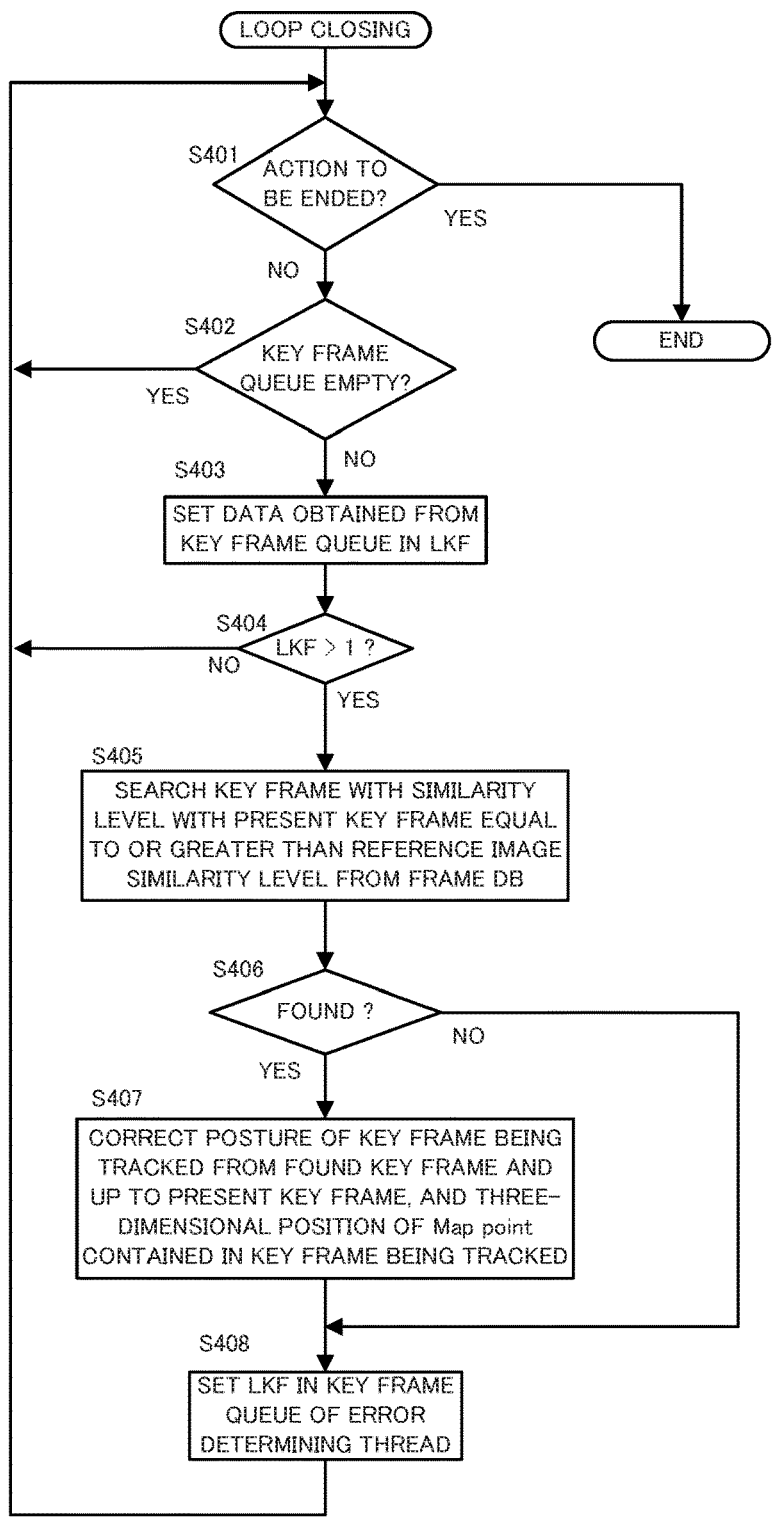
FIG. 6 is a flowchart for a process in a loop closing thread of the autonomous movement control process according to the embodiment.

Next, an explanation will be given of the loop closing thread launched in the step S103 in the main flow (see FIG. 3) for the autonomous movement device 100 with reference to FIG. 6. In this thread, the controller 10 keeps checking whether or not the loop closing process is executable, and executes the loop closing process when determining as executable. Note that the loop closing process is to correct, based on a difference between the posture value when reached this site last time and the present posture value, the key frame being tracked up to the present time after reached this site last time and the three-dimensional position of the relevant Map point when the controller 10 recognized that the local device has returned to the site where the local device once reached in past.

First, the controller 10 determines (step S401) whether or not to end the action. When the action is to be ended (step S401: YES), the action is ended. When the action is not to be ended (step S401: NO), the controller 10 determines whether or not the key frame queue is empty (step S402). When the key frame queue is empty (step S402: YES), the controller 10 returns the process to the step S401, and when the key frame queue is not empty (step S402: NO), the controller 10 takes out data from the key frame queue, and sets (step S403) in an LKF (a variable indicating the key frame number of the key frame to be processed in the loop closing thread). Next, the controller 10 determines (step S404) whether or not the LKF is greater than 1. When the LKF is zero or 1 (step S404: NO), the controller 10 returns the process to the step S401, and waits for until the data is entered in the key frame queue. Next, when the LKF is equal to or greater than 2 (step S404: YES), the following process is executed.

The controller 10 refers to the frame DB, and searches (step S405), from the frame DB, the key frame that has a similarity level which is of the "feature of the key frame itself" relative to the present key frame (the key frame that has the key frame number of LKF), and which is equal to or greater than a predetermined similarity level (for example, 0.9, hereinafter, referred to as the "reference image similarity level"). In this case, when the feature of the image (the key frame) is represented by the feature vector, the similarity level may be the absolute value of the inner product of the feature vectors of the two images normalized to 1, or may be the inner product of the absolute values (square root of sum of squares of the element) of the respective feature vectors of the two images normalized to 1. In addition, the inverse number of the distance (square root of sum of squares) of the feature vectors (the absolute value normalized to 1) of the two images may be adopted as the similarity level.

The controller 10 determines (step S406) whether or not the key frame that has the similarity level of the "feature of the key frame itself" which is equal to or greater than the reference image similarity level. When no such a frame is found (step S406: NO), the process goes to the step S408, and when such a frame is found (step S406: YES), the key frame posture being tracked from the found key frame to the present key frame, and the three-dimensional position of the Map point in the key frame being tracked are corrected (step S407). For example, the controller 10 corrects the posture of the present key frame to the posture of the found key frame. Next, using a difference between the posture of the found key frame and that of the present key frame, the posture of each key frame being tracked from the found key frame and up to the present key frame is corrected linearly. In addition, the three-dimensional position of the Map point contained in each key frame is also corrected in accordance with the correction amount of the posture of each key frame.

Subsequently, the controller 10 sets (step S408) the LKF in the key frame queue of an error determining thread, and returns the process to the step S401.

Next, an explanation will be given of the error determining thread launched in the step S104 in the main flow (see FIG. 3) for the autonomous movement device 100 with reference to FIG. 7. This thread causes the determiner 14 to determine the difference between the estimated position by the position estimator 13 through the SLAM scheme (the position obtained by the visual odometry) and the position obtained by the position measurer 11 by the odometry, and causes the map editor 15 to delete the map when this difference is out of the predetermined error range since this indicates that the error contained in the created map information is large.

In this thread, first, the controller 10 determines (step S501) whether or not to end the action, and when the action is to be ended (step S501: YES), the action is ended, and when the action is not to be ended (step S501: NO), the controller 10 determines (step S502) whether or not the key frame queue of the error determining thread is empty. When the key frame queue is empty (step S502: YES), the controller 10 returns the process to the step S201, and waits for until the data is entered in the key frame queue.

When the key frame is not empty (step S502: NO), the controller 10 takes out the data from the key frame queue, and sets (step S503) in the IKF (a variable indicating the key frame number of the key frame to be processed in the error determining thread). Next, the controller 10 determines (step S504) whether or not the IKF is greater than zero. When the IKF is zero (step S504: NO), the controller 10 returns the process to the step S501, and waits for until the data is entered in the key frame queue. When the IKF is equal to or greater than 1 (step S504: YES), the following process is executed.

The controller 10 refers to the frame DB, obtains an absolute value of a difference $\phi_d = |\phi_1 - \phi_2|$, an amount of change in direction of the local device) between a rotation angle $\phi_1$ obtained from the odometry of the last key frame (the key frame that has the key frame number of IKF−1) and a rotation angle $\phi_2$ obtained from the odometry of the present key frame (the key frame that has the key frame number of IKF), and compares (step S505) $\phi_d$ with a predetermined rotation angle $\phi_r$ (for example, 5 degrees, hereinafter, referred to as a "reference rotation angle $\phi_r$" or a "reference direction change amount"). When $\phi_d$ is obtained, the controller 10 serves as a direction change amount obtainer.

When $\phi_d$ is equal to or greater than $\phi_r$ (step S505: NO), the controller 10 clears (step S506) the counter NI, returns the process to the step S501, and waits for the next key frame. Next, when $\phi_d$ is less than $\phi_r$ (step S505: YES), the controller 10 increments (step S507) the counter NI, and determines (step S508) whether or not the counter NI is less than a predetermined number of accumulations C (for example, 10, hereinafter, referred to as a "reference accumulation number"). When the counter NI is less than the reference accumulation number C (step S508: YES), the controller 10 returns the process to the step S501, and waits for the next key frame. Since the counter NI is incremented every time the autonomous movement device 100 moves by the reference translation distance, the controller 10 is capable of obtaining the amount of change in position of the autonomous movement device 100 that is the reference translation distance×NI based on the value of NI. In this case, the controller 10 serves as a position change amount obtainer. Next, when the counter NI is equal to or greater than the reference accumulation number C, the determiner 14 executes the following determination. Hence, the reference position change amount that defines the determination condition becomes the reference translation distance×C.

When the counter NI is equal to or greater than the reference accumulation number C (step S508: NO), the determiner 14 obtains the translation distance in the SLAM coordinate system based on the posture change from the key frame C times previously (the key frame that has the key frame number of IKF-C) and up to the present key frame (the key frame that has the key frame number of IKF), and sets (step S509) the obtained distance as T1. In addition, the determiner 14 obtains the translation distance by the odometry from the key frame C times previously and up to the present key frame, and sets (step S510) the obtained distance as T2. How to obtain the T1 and the T2 will be explained below in more detail.

Since the frame DB stores the "posture" (the local device position (translation vector t) in the SLAM coordinate system when the image is picked up, and the direction (rotation matrix R)) of each key frame and the "posture obtained from the odometry in the actual environment" (the position and the direction obtained based on the distance in the actual environment), in the simplest scheme, the magnitude of a difference ($|t_1 - t_2|$) between the translation vector $t_1$ of the key frame C times previously and the translation vector $t_2$ of the present key frame may be obtained as T1 (calculated using the translation vector t in the SLAM coordinate system) or T2 (calculated using the obtained value from the odometry). Alternatively, the magnitude of the difference in translation vector between the adjacent key frames may be added by C times to the C+1 number of key frames from the key frame C times previously and up to the present key frame ($\Sigma |t_i - t_{i+1}|$), and the result may be taken as T1 or T2.

Next, the determiner 14 clears out (step S511) the counter NI. In addition, since T1 is the value in the SLAM coordinate system, in order to accomplish a conversion into the distance in the actual environment, T1 that is multiplied by the scale S is taken as T3 (step S512). Subsequently, the determiner 14 determines (step S513 and step S514) whether or not the difference between T2 and T3 is within a predetermined error range (in the example case illustrated in the flowchart, within 1.5 times). When the difference is within the predetermined error range (T2 is less than T3×1.5 (step S513: YES) and is greater than T3÷1.5 (step S514: YES)), the map information (information in the Map-point DB and information in the frame DB) is not so imprecise, and thus the determiner 14 returns the process to the step S501, and waits for the next key frame.

When the difference between T2 and T3 exceeds the predetermined error range (T2 is equal to or greater than T3×1.5 (step S513: NO) or is equal to or less than T3÷1.5 (step S514: NO)), since the created map information (information in the Map-point DB and information in the frame DB) is imprecise, the map editor 15 clears out (step S515) all of the initialization completion flag, the Map-point DB, the frame DB, and the key frame queue of each thread. Next, the controller 10 starts over the process from the step S501. Since the initialization completion flag and the key frame queue are cleared out, all threads are started over from the beginning. By adopting this process procedure, the autonomous movement device 100 is prevented from continuously moving with the created map containing an error.

When the difference between T2 and T3 exceeds the predetermined range, this indicates that the map information at this time point is imprecise, but when the difference between T2 and T3 was within the predetermined range in the past process of the error determining thread, there is also a possibility that the map information is not so imprecise. Hence, when the determination result in the step S514 is YES, before the process returns to the step S501, the map editor 15 may store the map information (Map-point DB) at this time point in the unillustrated map preserver as a "possibly precise map", and may recover the Map-point DB to the past stored condition without clearing out the initialization completion flag, the frame DB, and the key frame queue in each thread in the step S515. This enables an effective utilization of the map information created in past.

As for the scheme of recovering the Map-point DB to the past condition, in addition to a scheme of storing the information on the entire Map-point DB as the "possibly precise map", a scheme of storing information on a time stamp (time information may be applicable but application of the value of the key frame counter NKF may be rational) together with each element of the Map-point DB is also applicable. According to this scheme, when the determination result in the step S514 is YES, before the process returns to the step S501, the map editor 15 may set the time stamp (time information or NKF) at this time point in a variable TS that is a time memory (this variable TS may also employ a stack structure, and may return to the past value one after another), and the map editor 15 may execute, in the step S515, a process of deleting, among the pieces of information in the Map-point DB, information that has a later time stamp than the TS, and leaving, as those are, the pieces of information that have the time stamp previous to the TS. When such a process is executed, the past and possibly precise information on the Map point is preserved, and only the recent (considerable as containing a large error) information on the Map point is deleted.

This scheme is also applicable to the frame DB, and the map editor 15 may delete, among the pieces of information in the frame DB, the information that has a larger key frame number than the TS, and may leave, as those are, the pieces of information that have the key frame number previous to the TS. This enables the map editor 15 to preserve the past and possibly precise key frame information but to delete only the recent (considerable as containing a large error) key frame information.

Note that in the above embodiment, the rotation angle $\phi_d$ to be compared in the step S505 is calculated based on the obtained rotation angle from the odometry, but may be calculated based on the rotation angle obtained from the visual odometry (the rotation angle obtained from R of the "posture (the position and the direction represented by the translation vector t and the rotation matrix R in the SLAM coordinate system)" of each key frame stored in the frame DB). More specifically, when the rotation matrix for the posture of the last key frame is R1, and the rotation matrix for the posture of the present frame is R2, by calculating $R3=R2\times R1^{-1}$, a rotation matrix R3 that represents a rotation from the last key frame and to the present key frame is obtainable (where $R^{-1}$ is an inverse matrix of R1 (the rotation matrix always has an inverse matrix)). Hence, the rotation angle around each axis is obtainable based on each element of the obtained rotation matrix R3. When the rotation matrix is three by three, the rotation angle around each axis is not uniquely obtainable from the rotation matrix in some cases, but in reality, the autonomous movement device 100 moves on a floor like a plane in the most cases. Accordingly, approximation to the rotation matrix of two by two uniquely defines the rotation angle. By utilizing the visual odometry in this manner, the rotation angle $\phi_d$ is obtainable without an adverse effect of the aged deterioration of the driver 42, the slip, and the like.

In view of the adverse effect of the aged deterioration of the driver 42, the slip, and the like, when the aged deterioration is little and the autonomous movement device 100 is moving on a floor without a slip, the controller 10 may adopt the rotation angle obtained from the odometry, and when not so, the controller 10 may adopt the rotation angle obtained from the visual odometry.

In addition, when the autonomous movement device 100 includes the direction sensor, the value from the direction sensor when each key frame is obtained may be also stored in the frame DB, and the controller 10 may determine, in the step S505, whether or not the rotation angle $\phi_d$ based on the direction obtained by the direction sensor is less than the reference rotation angle $\phi_r$.

Figure 7:
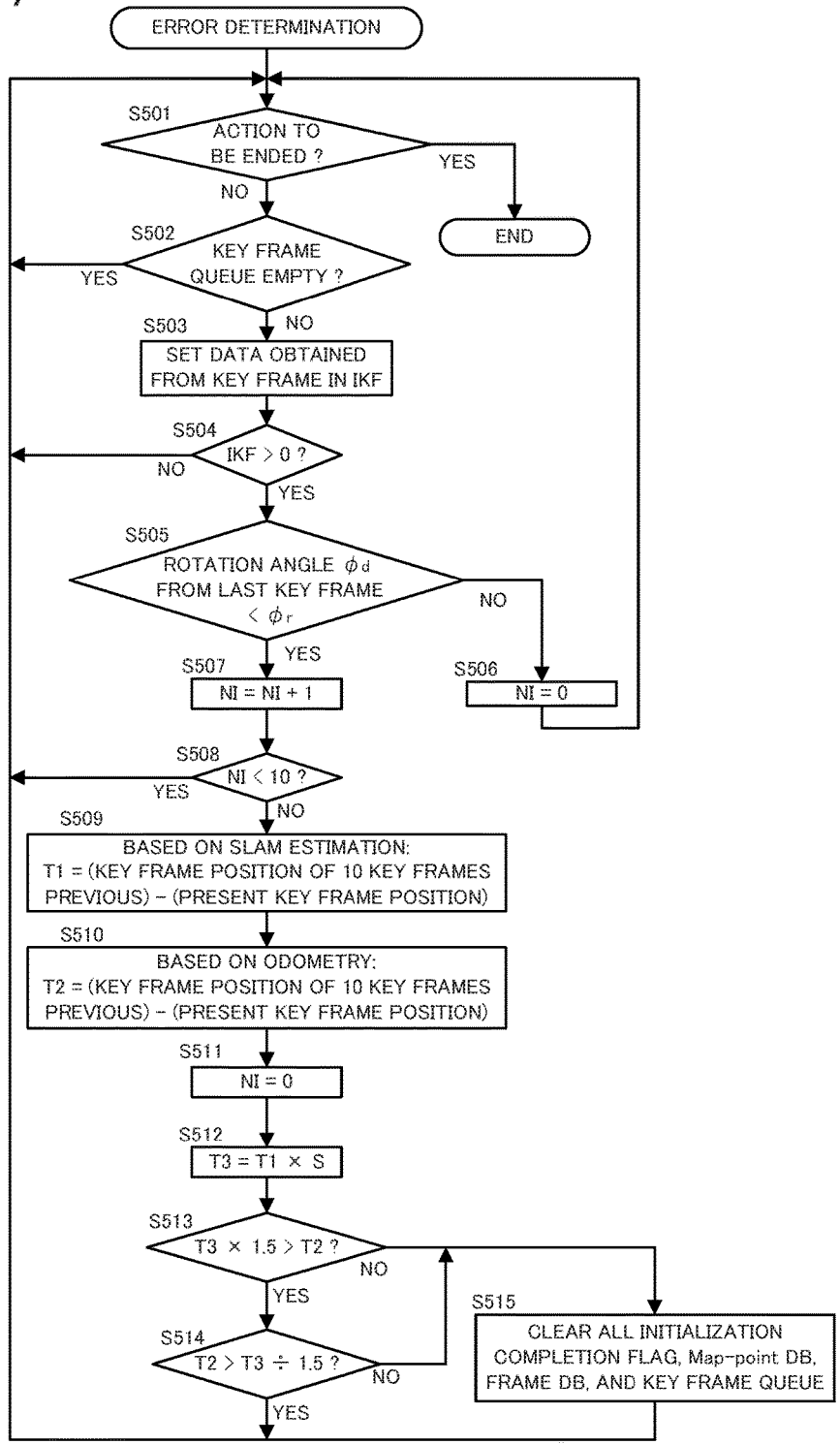
FIG. 7 is a flowchart for a process in an error determining thread of the autonomous movement control process according to the embodiment.

Still further, in the flowchart that is FIG. 7, the rotation angle $\phi_d$ is the rotation angle from the last key frame, but the controller 10 may determine in the step S505 whether or not the rotation angle from the key frame at a time point at which the counter NI=0 is less than the reference rotation angle $\phi_r$. Hence, a case in which the autonomous movement device 100 moves so as to rotate little by little in the same direction is excluded from the determination target in the error determining thread.

Yet still further, in the flowchart that is FIG. 7, the reference accumulation number C that is the threshold of the counter NI is set to 10, and the predetermined error range when the difference between T2 and T3 is determined is set to 1.5 times, but the value of C may be other values than 10, and the predetermined error range may be other value than 1.5 times. For example, the value C may be set to 5, and the predetermined error range may be set to 1.3 times, or the value C may be set to 20, and the predetermined error range may be set to 2.0 times. The closer the predetermined error range becomes to 1 within a range greater than 1, the stricter the determination condition becomes. This causes the map editor 15 to clear out the map information when the map information (information in the Map-point DB, and the like) contains even a minor error.

Still further, in the steps S507-S508 in FIG. 7, and the like, the translation distance obtained from the odometry may be taken as the threshold for the determination instead of the value of the counter NI. For example, a condition in which "until the translation distance by the odometry becomes equal to or greater than the reference translation distance" may be applied. In this case, in the step S220 of the local device position estimating thread and in the steps S506 and S511 of the error determining thread, a condition in which "the translation t obtained from the odometry is set to tI1" may be applied instead of the condition in which "NI=0", a condition in which "the translation t obtained from the odometry is set to tI2" may be applied in the step S507, and a determination may be made in the step S508 on whether or not |tI1−tI2| (position change amount) is less than the reference translation distance.

In addition, as for the other scheme that does not utilize the counter NI, when a translation distance D is obtained with the rotation angle obtained from the odometry between the key frames being maintained at zero (that is, a straight movement without any rotation is made), the odometry translation distance T2 may be determined as D. In this case, in the step S220 of the local device position estimating thread and in the steps S506 and S511 of the error determining thread, a condition in which "the rotation R obtained from the odometry is set to RI, and the translation t obtained from the odometry is set to tI1" may be applied instead of the condition in which "NI=0", a condition in which "the rotation R obtained from the odometry is compared with the RI, and when consistent with RI (this means there is no rotation), the process progresses to the step S507, and when different from RI (this means there is a rotation), the process progresses to the step S506" may be applied in the step S505, a condition in which "the translation t obtained from the odometry is set to tI2" may be applied in the step S507, and a determination may be made in the step S508 on whether or not "|tI1−tI2|<D". In this case, a condition in which "T2 is set to D" is applied in the step S510.

Still further, when the built-in acceleration sensor 31 detects an acceleration that is apparently different from the autonomous movement of the autonomous movement device 100, for example, there is a possibility such that a person lifts up the autonomous movement device 100 and moves this device. In this case, the controller 10 clears out the counter NI to zero. More specifically, right before (or right after) the step S505 in FIG. 7, a process of causing the controller 10 to "compare the value from the acceleration sensor 31 with the calculated acceleration from the odometry, and to progress the process to the step S506 when a difference that exceeds the predetermined range occurs" may be added. This causes the determination action in the error determining thread to be reset, and thus unintended deletion of the map information (Map-point DB, and the like) is prevented. When the value of the acceleration is obtained from the acceleration sensor 31, the controller 10 serves as an acceleration obtainer. In addition, when the acceleration is obtained from the odometry, the controller 10 serves as an acceleration calculator. Note that since the acceleration is obtained as a three-dimensional vector value, the difference in the acceleration is also a three-dimensional vector value, but as for the determination on whether or not the difference that exceeds the predetermined range has occurred may be determined based on whether or not the absolute value (square root of sum of squares) of the difference in vector exceeds a predetermined value.

In addition, when the slip of the wheel is large, in the extreme case, when the wheel spins, and the like, the load applied to the motor that is driving the wheel suddenly decreases, and thus a current that flows through the motor changes. Hence, by checking the relationship between the measurement result by the odometry and the motor current, an occasion of a large slip, a spin, and the like are detectable. When a large slip, a spin, and the like are detected, the controller 10 clears the counter NI to zero, thereby resetting the determination action in the error determining thread. Hence, the occasion of a large slip, a spin, and the like can be excluded from the determination target. More specifically, right before (or right after, either the above acceleration sensor determination and this slip determination may be performed at first) the step S505 in FIG. 7, a process of causing the controller 10 to "compare the actual motor current value with the estimated motor current from the odometry, and to progress the process to the step S506 when a difference that exceeds the predetermined range occurs" may be added. When the current value that flows through the motor is to be obtained, the controller 10 servers as a current obtainer. In addition, when the current value flowing through the motor is estimated based on the information from the odometry, the controller 10 serves as a current estimator. This enables a determination that utilizes only cases other than a case in which a large slip, a spin, and the like occurs, suppressing unintended deletion of the map information (Map-point DB, and the like).

Still further, since the driver 42 has an aged deterioration and becomes unable to maintain the odometry precision, the controller 10 may increase the threshold $\phi_r$ of the rotation angle $\phi_d$ in accordance with the increase in accumulated moved distance. This causes the controller 10 to also make a determination when the translation movement together with a rotation action that decreases the odometry precision is made, and thus the map information (Map-point DB and the like) created when the odometry precision is not high can be eliminated.

Yet still further, the threshold $\phi_r$ may be changed in accordance with a use environment. For example, the controller may measure the running plane using an unillustrated reflection sensor, and estimate that the running plane is likely to cause a slip when there is a mirror-surface reflection, and increase the threshold or. Conversely, when there is a diffuse reflection, the controller 10 may estimate that the running plane is not likely to cause a slip, and decrease the threshold $\phi_r$. Hence, in accordance with the condition of the running plane, the controller 10 also makes a determination when the running plane is likely to cause a slip that has a relatively large rotation action, and when the running plane is not likely to cause a slip, a determination is made only when there is little rotation action.

In addition, the controller 10 may cause the autonomous movement device 100 to move straight at a constant cycle, and cause the determiner 14 to forcibly determine a difference between the odometry and the visual odometry. This prevents the autonomous movement device 100 from continuously moving with the map information (Map-point DB and the like) containing an error.

In the above embodiment, the explanation has been given of an example case in which the image picker 41 is a monocular SLAM, but the same structure can be employed in the case of a multi-lens SLAM that includes multiple image pickers. When, for example, the autonomous movement device 100 includes the two image pickers 41, the two images are obtainable at the same position without any movement. Hence, the two images are obtained by a single action in the step S204 in the initializing process of the local device position estimating thread. When each of the two images contains the feature points that are equal to or greater than the reference value (determined in the step S206), the determination on "N=N+2" is made in the step S207, and the determination result in the step S208 always becomes "NO". Next, when either the two images is taken as the last frame, and the other is taken as the present frame to execute the process, the "odometry translation distance" when the scale S is calculated in the step S219 may be a distance between the two image pickers. Hence, even if the positional precision obtained from the odometry is not high, a stable initialization is enabled.

In this case, however, the distance between the two image pickers is often shorter than the reference translation distance (for example, 1 m) normally applied, and when the precision of the obtained translation distance from the odometry is high, a higher precision may be obtained when the same initializing process as that of the monocular SLAM (for example, the initializing process using only a first image picker among the multiple image pickers) is executed. Hence, the same initializing process as that of the monocular SLAM and the initializing process using the two image pickers as explained in the above paragraph may be both executed, the map information (Map-point DB and frame DB) may be created through both processes, and the same process as the error determining thread may be executed during the map information creation to determine the error, and the map information that has a smaller error may be adopted.

Note that in the above embodiment, the value of the reference translation distance is set to, for example, "1 m", but the optimized reference translation distance changes in accordance with the size of het autonomous movement device itself and the speed thereof, the environment in which the autonomous movement device 100 moves, the movement range, and the like. Accordingly, how to set the reference translation distance will be supplementary explained below.

As the setting scheme of the reference translation distance, such a reference translation distance may be set in accordance with a ratio between the average value (=an average distance of the depths up to all Map points observed in the key frame) of the distance from the three-dimensional positions of all Map points (the two-dimensional feature points that have the known three-dimensional position) over the key frame and to the local device, and, the translation distance (for example, the distance that is 5% of the average distance of the depths up to the Map points is set as the reference translation distance). "All Map points" applied in this case are extractable by the controller 10 that refers to the Map-point DB. In addition, when, for example, the autonomous movement device 100 moves on a surface of a table, the reference translation distance may be set to 10 cm, when the autonomous movement device 100 moves on a floor of a room, the reference translation distance may be set to 1 m, and when the autonomous movement device 100 moves around an outdoor open space, the reference translation distance may be set to 10 m, in accordance with the translation distance in the actual environment. Alternatively, the value in accordance with the wheel diameter of the driver 42 (for example, 10 times as much as the wheel diameter) may be set as the reference translation distance.

When the reference translation distance is set in accordance with the distance in the actual environment, as for the translation distance in the SLAM coordinate system, a conversion to the distance in the actual environment by multiplication of the scale S is executed for the comparison (the same is true in the opposite case, and when the distance in the SLAM coordinate system is set as the reference translation distance, the distance in the actual environment is divided by the scale S so as to be converted into the distance in the SLAM coordinate system for the comparison).

Note that the respective functions of the autonomous movement device 100 according to the present disclosure are realizable by a general computer like a Personal Computer (PC). More specifically, in the above embodiment, the explanation has been given of an example case in which the program for the autonomous movement control process executed by the autonomous movement device 100 is stored in the ROM of the memory 20 beforehand. However, the program may be distributed in a manner recorded in a non-transitory computer-readable recording medium, such as a flexible disk, a Compact Disc Read Only Memory (CD-ROM), a Digital Versatile Disc (DVD), or a Magneto-Optical disc (MO), and may be read and installed in a computer to accomplish the computer that realizes the respective functions explained above.

Figure 8:
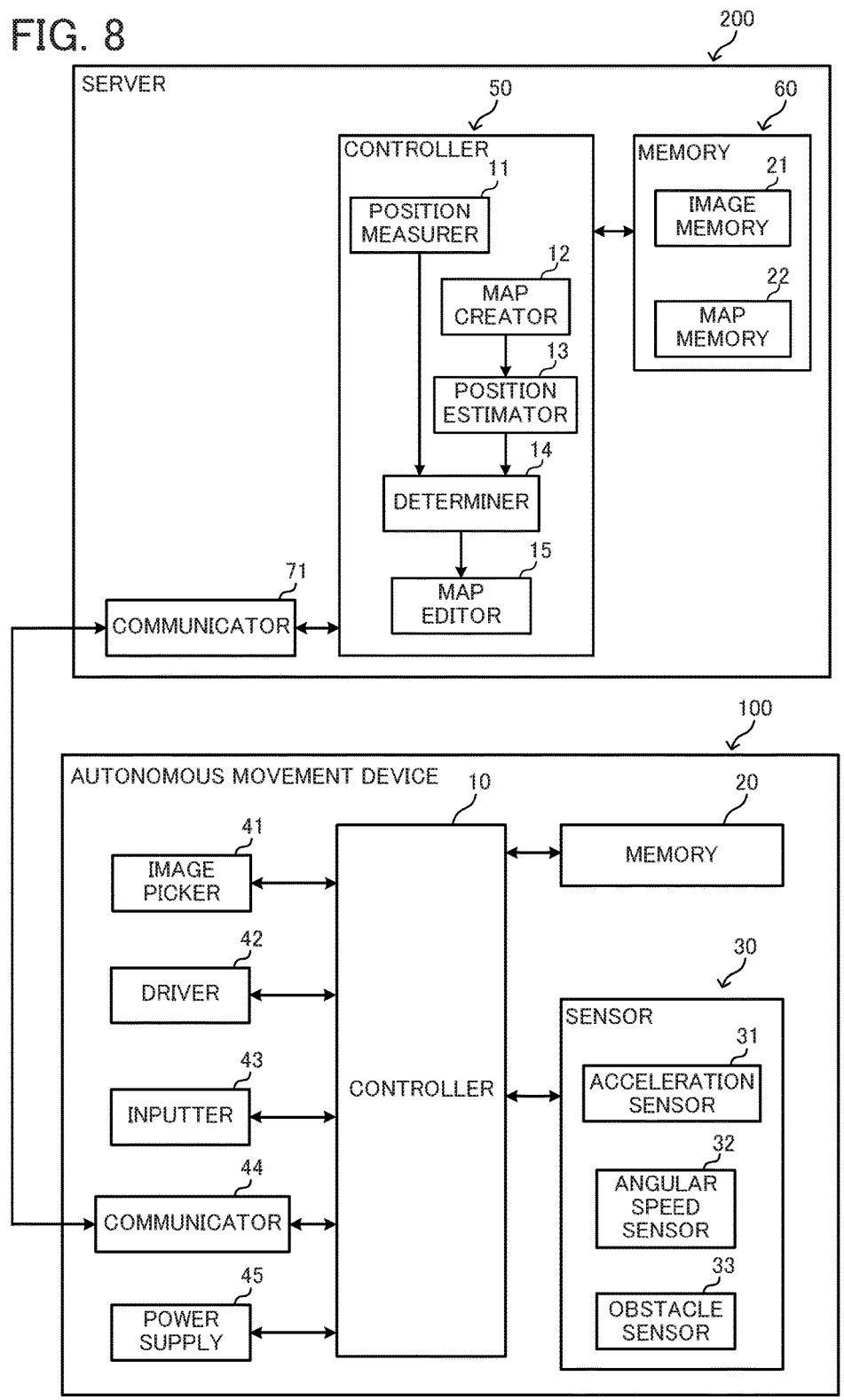
FIG. 8 is a diagram illustrating an example structure in which a part of a controller, and the like, is provided in an external server.

In addition, this computer may be built in the autonomous movement device 100 or may be an individual apparatus from the autonomous movement device 100. That is, as illustrated in FIG. 8, the controller, the memory, and the like may be provided in an external server 200. In accordance with a cloud-computing technology, the controller 10 of the autonomous movement device 100 may transmit data obtained by the image picker 41, the sensor 30, and the like to the external server 200 via the communicator 44, cause the external server 200 to execute arithmetic processing, receive the arithmetic process result by the external server 200 via the communicator 44, and control the driver 42 and the like. In FIG. 8, a controller 50 of the external server 200 includes the position measurer 11, the map creator 12, the position estimator 13, the determiner 14, and the map editor 15, and the controller 10 of the autonomous movement device 100 includes the rotational image picker 11. However, either the controller 50 of the external server 200 or the controller 10 of the autonomous movement device 100 may include the respective components. Which one of either the controller 50 of the external server 200 or the controller 10 of the autonomous movement device 100 may include the respective components is a design option that may be addressed as appropriate.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous movement device comprising:
   a driver which includes a motor and which drives the autonomous movement device to move;
   an image picker which includes a camera and which picks up a plurality of images;
   a map memory that stores a map created using information on the plurality of images picked up by the image picker; and
   at least one hardware processor which is configured to:
   measure a local device position based on an amount of movement by the driver;
   estimate the local device position based on the information on the plurality of images picked up by the image picker and information on the map stored in the map memory;
   determine whether or not a difference between the measured local device position and the estimated local device position is within a predetermined error range; and
   edit the map stored in the map memory when it is determined that the difference between the measured local device position and the estimated local device position is out of the predetermined error range,
   wherein the driver drives the autonomous movement device to move based on the edited map.

2. The autonomous movement device according to claim 1, wherein the at least one hardware processor is further configured to obtain an amount of change in direction of the autonomous movement device,
   wherein the at least one hardware processor makes the determination when the obtained change amount in direction is smaller than a reference direction change amount.

3. The autonomous movement device according to claim 2, wherein the at least one hardware processor is further configured to obtain an amount of change in position of the autonomous movement device,
   wherein the at least one hardware processor makes the determination when the obtained change amount in position is greater than a reference position change amount, and the obtained change amount in direction is smaller than the reference direction change amount.

4. The autonomous movement device according to claim 1, wherein the at least one hardware processor deletes the map stored in the map memory upon determination that the difference is out of the predetermined error range.

5. The autonomous movement device according to claim 1,
   wherein the at least one hardware processor is further configured to preserve the map stored in the map memory upon determination that the difference is within the predetermined error range, and
   wherein the at least one hardware processor stores the preserved map in the map memory upon determination that the difference is out of the predetermined error range.

6. The autonomous movement device according to claim 1, further comprising a time memory that stores information on a time at which the at least one hardware processor determines that the difference is within the predetermined error range, wherein:
the map memory stores the information on the map together with information on a time at which the map is created; and
the at least one hardware processor deletes, among the pieces of information on the map stored in the map memory, the information on the map created after the time stored in the time memory upon determination that the difference is out of the predetermined error range.

7. The autonomous movement device according to claim 6, further comprising an image memory that stores information on the picked-up image together with information on a time at which the image is picked up, wherein:
the map memory stores the map created using the information on the plurality of images stored in the image memory; and
the at least one hardware processor deletes, among the pieces of information stored in the image memory, the information on the image picked up after the time stored in the time memory upon determination that the difference is out of the predetermined error range.

8. The autonomous movement device according to claim 1, wherein:
the image picker is a monocular camera; and
the at least one hardware processor estimates the local device position based on the information on the plurality of images picked up by the image picker.

9. The autonomous movement device according to claim 1,
wherein the at least one hardware processor is further configured to:
obtain an acceleration by an acceleration sensor; and
calculate an acceleration of the autonomous movement device based on the amount of movement by the driver,
wherein when a difference between the obtained acceleration and the calculated acceleration exceeds a predetermined value, the at least one hardware processor does not edit the map stored in the map memory even if it is determined that the difference between the measured local device position and the estimated local device position is out of the predetermined error range.

10. The autonomous movement device according to claim 1, wherein the at least one hardware processor is further configured to:
obtain a value of a current flowing through the motor of the driver; and
estimate a value of the current flowing through the motor based on the amount of movement by the driver,
wherein when a difference between the current value obtained by the current obtainer and the current value estimated by the current estimator exceeds a predetermined value, the at least one hardware processor does not edit the map stored in the map memory even if it is determined that the difference between the measured local device position and the estimated local device position is out of the predetermined error range.

11. The autonomous movement device according to claim 1, wherein the at least one hardware processor comprises a hardware processor of a server which remotely communicates with a main device body of the autonomous movement device, wherein the driver and the image picker are provided in the main device body of the autonomous movement device, and
wherein the hardware processor of the server is configured to perform, based on information transmitted from the main device body of the autonomous movement device, at least one of the measuring of the local device position, the estimation of the local device position, the determination of whether or not the difference between the measured local device position and the estimated local device position is within the predetermined error range, and the editing of the map stored in the map memory.

12. The autonomous movement device according to claim 11, wherein the map memory is provided in the server.

13. An autonomous movement method for an autonomous movement device comprising a driver which includes a motor and which drives the autonomous movement device to move, and an image picker which includes a camera, the method comprising:
measuring a local device position based on an amount of movement by the driver;
creating a map using information on a plurality of images picked up by the image picker;
estimating the local device position based on the information on the plurality of images picked up by the image picker and information on the created map;
determining whether or not a difference between the measured local device position and the estimated local device position is within a predetermined error range;
editing the created map when a determination is made in the determining that the difference between the measured local device position and the estimated local device position is out of the predetermined error range; and
driving the autonomous movement device to move with the driver, based on the edited map.

14. A non-transitory computer-readable recording medium having stored therein a program that is executable by a computer which controls an autonomous movement device comprising a driver which includes a motor and which drives the autonomous movement device to move, and an image picker which includes a camera, the program being executable by the computer to cause the computer to perform functions comprising:
measuring a local device position based on an amount of movement by the driver;
creating a map using information on a plurality of images picked up by the image picker;
estimating the local device position based on the information on the plurality of images picked up by the image picker and information on the created map;
determining whether or not a difference between the measured local device position and the estimated local device position is within a predetermined error range;
editing the created map when a determination is made in the determining that the difference between the measured local device position and the estimated local device position is out of the predetermined error range; and
driving the autonomous movement device to move with the driver, based on the edited map.

* * * * *